United States Patent [19]
Crowther et al.

[11] Patent Number: 5,384,817
[45] Date of Patent: Jan. 24, 1995

[54] X-RAY OPTICAL ELEMENT AND METHOD FOR ITS MANUFACTURE

[75] Inventors: David J. Crowther, Farmington Hills; George Gutman, Birmingham, both of Mich.

[73] Assignee: Ovonic Synthetic Materials Company, Troy, Mich.

[21] Appl. No.: 89,832

[22] Filed: Jul. 12, 1993

[51] Int. Cl.⁶ .............................. G21K 1/06
[52] U.S. Cl. ............................ 378/84; 378/145
[58] Field of Search .............. 378/84, 85, 145

[56] References Cited

U.S. PATENT DOCUMENTS 4,727,000  2/1988  Ovshinsky et al. ............... 428/635
4,785,470  11/1988  Wood et al. ..................... 378/84

OTHER PUBLICATIONS

S. S. Andreev et al., "Superintense Laser Fields: Generation interation with matter and x-ray sources," *SPIE Proceedings* vol. 1800, pp. 195–208.

Pierre Boher et al., "Tungsten/boron nitride multilayers for X-UV optical applications." *SPIE*, vol. 1546, *Multilayer and Grazing Incidence X-ray/EUV Optics* (1991) pp. 520–536.

*Primary Examiner*—Craig E. Church
*Attorney, Agent, or Firm*—Krass & Young

[57] ABSTRACT

X-ray dispersive elements comprise a stacked array of layer pairs of boron nitride and either nickel, tungsten, chromium, vanadium, iron, manganese, cobalt and combinations thereof. The boron nitride is preferably deposited through a planar magnetron sputtering process.

11 Claims, 3 Drawing Sheets

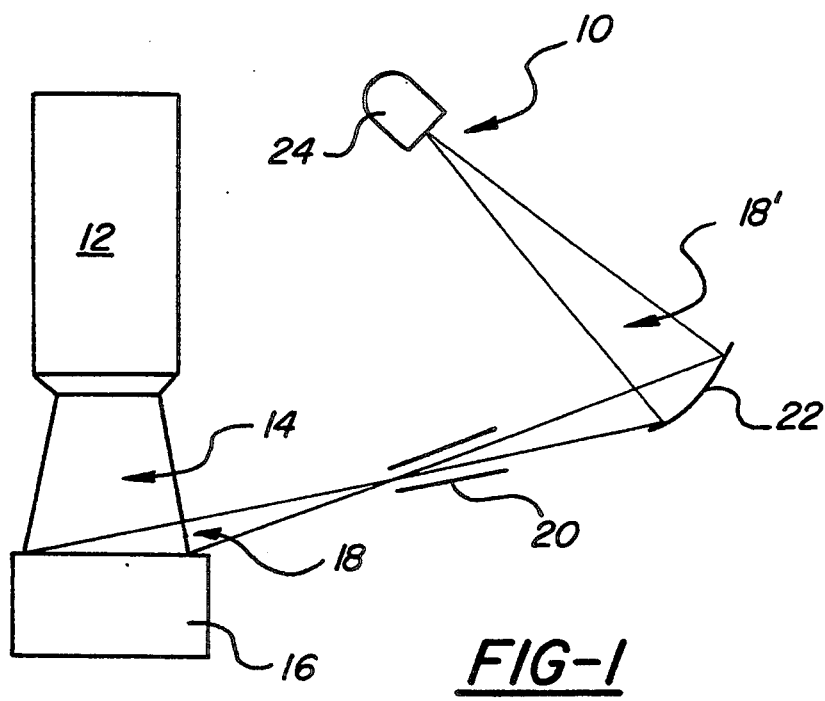
FIG-1
FIG-2
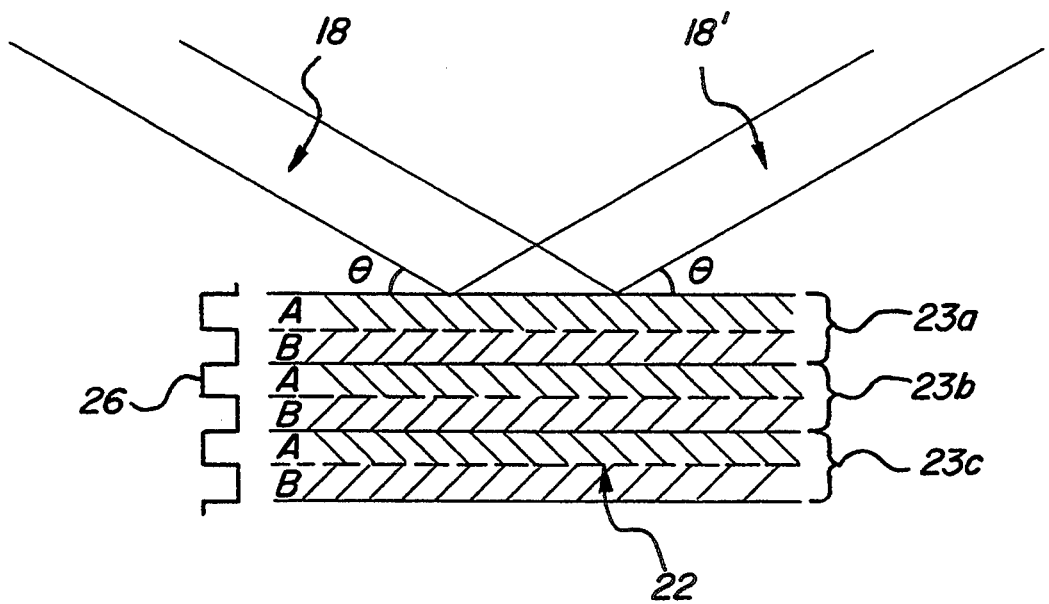

X-RAY OPTICAL ELEMENT AND METHOD FOR ITS MANUFACTURE

FIELD OF THE INVENTION

This invention relates to x-ray reflective structures and to methods for their manufacture.

BACKGROUND OF THE INVENTION

Optical elements capable of reflecting a beam of x-rays in preselected directions are useful in a variety of apparatus including x-ray monochromators, x-ray analyzers, x-ray imaging systems such as x-ray microscopes and the like. X-ray fluorescence is widely used for the qualitative and quantitative analysis of a variety of materials and the technique relies upon the use of an x-ray reflective element to resolve a multiple wavelength flux of x-rays into its component wavelengths through Bragg reflection. Bragg reflection is a phenomenon well known in the art and occurs when a beam of energy, such as x-rays is reflected from a series of planes of a periodic structure, such as a crystal. The reflections from the multiple planes establish an interference condition and the reflected wavelength will depend upon both the angle of incidence, $\theta$ and the spacing of the periodic structure referred to as "d". The reflected wavelength will be defined by the Bragg equation:

$$n\lambda = 2d \sin \theta$$

wherein n is the order of the diffraction. It will thus be appreciated that such x-ray reflective structures can be the functional equivalents of elements such as diffraction gratings, prisms, mirrors or lenses which are used at visible wavelengths.

Natural crystals have previously been employed as x-ray reflective elements; however, the utility of these materials has been limited by the fact that the d-spacing of the crystalline planes is defined by the lattice parameters of the crystal. Also, a number of crystalline materials are unsuitable because they do not adequately reflect the appropriate wavelengths of x-rays and/or because they fluoresce or otherwise interfere with the intended use of the reflective element.

Natural crystals generally have lattice spacings which do not significantly exceed 10 angstroms. These spacings are adequate for fairly high energy x-rays; however, in many instances it is desirable to measure the x-ray fluorescence of relatively light elements; therefore, relatively soft, long wavelength x-rays must be employed thereby necessitating d-spacings significantly larger than those found in natural crystals. Toward that end, the art has investigated a number of synthetic structures. The earliest structures were comprised of molecular layers of heavy metal soaps, such as lead myristate or lead stearate. These materials are referred to as Langmurr-Blodgett (LB) films. While they can provide large lattice spacings, their lattice parameters are limited to specific values. Furthermore, the materials are soft, and difficult to prepare and are very unstable in ambient conditions; they also tend to decompose under high fluxes of x-rays.

Another approach involves the use of multilayered thin films. These reflective structures comprise a plurality of stacked layer pairs. One member of each pair comprises a material having a very high x-ray reflectivity, and the second member of the pair, often referred to as a spacer, comprises a material having a lower reflectivity. In this manner, there is provided a periodic structure which is the one dimensional analog of a crystal. It will be appreciated that the thicknesses of the layers may be controlled so as to provide for a great deal of selectivity in the spacing. Such structures, and techniques for their manufacture, are disclosed in U.S. Pat. Nos. 4,693,933; 4,727,000 and 4,785,470, the disclosures of which are incorporated herein by reference.

Synthetic multi-layer structures are widely used in x-ray fluorescence analyzers; however, the performance of presently available multi-layer x-ray optical elements is less than adequate with regard to the analysis of relatively light elements such as nitrogen, oxygen and fluorine. This is because of the fact that the K shell fluorescent emission from these elements constitutes relatively soft x-radiation, and an element optimized for the Bragg reflection of these wavelengths requires a spacer material which has a relatively low absorption for soft x-rays. Also, operation at soft wavelengths, particularly those associated with the "water window" is important for x-ray microscopy; and consequently there is a need for imaging optics operative in this range. Multilayer technology allows for the coating of spherical, cylindrical, or other curved and irregular shapes so as to provide unique optical elements. Also, synthetic, multilayered structures may be fabricated with a graded d spacing wherein d varies across the surface of the structure. Such graded d spacing directs the reflected beam and controls reflection and are particularly useful as focusing elements.

Operation at soft x-ray energies is difficult because many of the conventionally employed spacer materials such as carbon, silicon, magnesium and the like are too absorbing to be part of an efficient reflective element operative at relatively low energies.

In accord with one prior art approach, a multilayer structure of iron and scandium may be employed as a reflective element for relatively soft x-rays. In this structure, iron acts as the reflective layer and scandium as the spacer. Scandium itself is a fairly high electron density material which is generally quite reflective of x-rays; however, scandium has the unusual property of having a resonance in its optical constants which produces a low absorption window at approximately 0.39 KeV. While the iron scandium structure is quite efficient at this specific energy range it is a very poor reflective element at energies only slightly higher and slightly lower. Hence its utility is limited primarily to nitrogen detection in the energy range of 0.39 KeV. In addition to being of relatively limited utility, this structure is somewhat difficult to fabricate. It is difficult to obtain smooth interfaces between the iron and scandium layers, and the poor interface quality degrades device performance. The device also presents problems of stability because of the high reactivity of scandium, especially when in the form of thin layers.

Another prior art approach to this problem is disclosed by Boher et al. in a paper entitled "Tungsten/Boron Nitride Multilayers for X-UV Optical Applications" published in *SPIE*, vol. 1546, *Multilayer and Grazing Incidence X-ray/EUV Optics* (1991) pp 520–536. Disclosed in this reference is the fabrication of tungsten/boron nitride x-ray reflective elements by reactive radio frequency diode sputtering. As noted therein, the boron nitride tends to decompose during the R.F. diode sputtering process; and consequently, a specifically controlled amount of nitrogen must be added to the deposition environment to control the stoichiometry of the resultant layer. Because of the difficulty in the control of the process and the lower than desired reflectivity of the resultant structure, there is still a need for an easy to fabricate an efficient, x-ray reflective element which can be used in the x-ray fluorescence analysis of relatively light elements; and most particularly in the wavelength region of 23-43 Å (normal incidence), as is typically encountered in the case of x-ray imaging optics such as in an x-ray microscope.

As will be described in further detail herein below, the present invention provides for improved x-ray optical elements having boron nitride based spacer layers, fabricated by a process which is easy to implement and control. The optical elements are highly efficient, environmentally stable and usable over a relatively wide energy range. These and other advantages of the present invention will be readily apparent from the drawings, discussion and description which follow:

BRIEF DESCRIPTION OF THE INVENTION

There is disclosed herein an x-ray reflective structure comprising a plurality of superposed layer pairs. The first member of each pair comprises a layer of boron nitride and a second member of each pair comprises a layer of a material selected from the group consisting of: nickel, cobalt, chromium, vanadium, iron, manganese, and combinations thereof. The x-ray dispersive structure has a d-spacing which is in the range of 10-200 angstroms. In one embodiment the structure comprises at least 50 pairs of layers. In one specific embodiment the d-spacing is approximately 55 angstroms; whereas, in another it is approximately 40 angstroms.

The boron nitride and metal layers may have sharp interfaces or they may be compositionally graded, as for example by sinusoidally varying the composition throughout the layer pairs.

The invention also includes a method for the manufacture of an x-ray dispersive element of the type which comprises a plurality of superposed layer pairs in which a first member of each of the pairs comprises a layer of boron nitride and the second layer comprises a material having an x-ray scattering strength greater than that of boron nitride. The method includes the steps of providing a substrate and depositing the layer pairs in sequence on the substrate by a vacuum deposition process which is characterized in that the layer of boron nitride of each of the layer pairs is deposited by a planar magnetron sputtering process. The layer of higher electron scattering strength material may also be deposited by a planar magnetron sputtering process, and the material may comprise tungsten, nickel, chromium, vanadium, iron, manganese, cobalt, or combinations thereof.

BRIEF DESCRIPTION OF THE DRAWINGS

FIG. 1 is a schematic representation of one embodiment of an x-ray analysis system which incorporates the x-ray reflective structure of the present invention;

FIG. 2 is a schematic depiction of an x-ray reflective element structured in accord with the present invention;

DETAILED DESCRIPTION OF THE INVENTION

Figure 3:
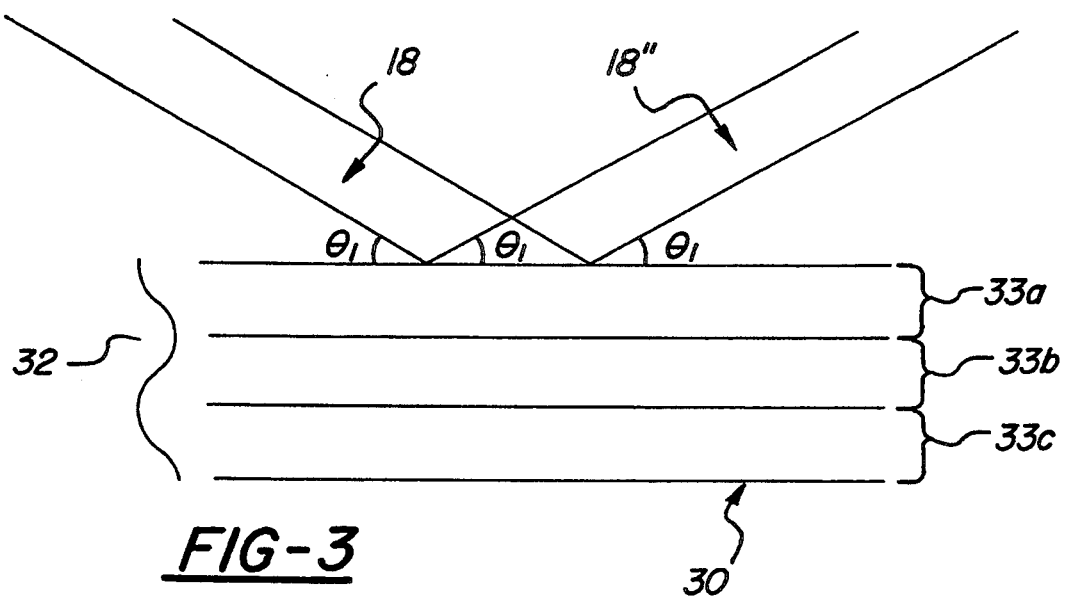
FIG. 3 is a schematic depiction of another x-ray reflective element structured in accord with the present invention.

FIG. 1 depicts a conventional x-ray fluorescence analysis system 10. This system is typical of apparatus which employ the reflective element of the present invention. The system 10 includes an x-ray source 12 operative to direct a beam of x-rays 14 at a sample 16 undergoing analysis. The x-ray beam 14 excites a fluorescent emission from various of the component atoms of the sample 16. The fluorescent radiation is generally emitted into the $2\pi$ steradian space from the sample 16, and in the illustrated embodiment, for the sake of clarity a portion 18 of the fluorescent emission is shown.

The analysis system 10 includes a device 20 such as a series of apertures or a collimator which serves to direct the beam 18 onto an x-ray reflective element 22 of the type disclosed herein. The beam of fluorescent radiation 18 includes a number of discrete wavelengths of x radiation, and as will be explained in greater detail herein below, the reflective element 22 functions to spatially separate the various wavelengths. In the illustrated embodiment, the analysis system further includes a detector 24 which is positioned so as to receive a portion, 18′, of the fluorescent emission. It will be appreciated that by appropriately positioning the detector, only that radiation corresponding to a specific element in the sample 16 may be detected.

In the illustrated apparatus 10 of FIG. 1, it will be noted that the reflective element 22 is curved. While the system may be operated with either planar or curved elements, it has been found that the incorporation of a slight curvature facilitates focussing of the reflected beam. For purposes of the illustration, the curvature of the element 22 is somewhat exaggerated. It is to be understood that the foregoing description of the apparatus is very general and numerous modifications thereof are well known in the art. For example, the apparatus may include a number of detectors positioned to receive various portions of the spatially separated fluorescent beam. Also, the apparatus may include a number of analyzing stations, each with its own reflective element and detectors. It is also to be understood that the present invention is not to be limited to x-ray reflective structures for use in analysis equipment of the type depicted in FIG. 1. The elements of the present invention may be employed in any system or application wherein the reflection of a beam of x-ray energy is required, especially including applications such as x-ray microscopy.

Referring now to FIG. 2, there is shown a somewhat schematic, cross-sectional view of an x-ray reflective structure 22 in accord with the present invention. The structure 22 comprises a plurality of superposed layer pairs 23a-23c. As will be noted each layer pair includes two distinct layers A and B. The first member, for example A, of each pair 23 comprises a layer of boron nitride and a second member of each pair, for example B, comprises a layer of a material having an x-ray scattering strength greater than that of boron nitride. In general, x-ray scattering strength will correlate with electron density. In one particularly preferred embodiment, the second layer B comprises a layer of nickel, tungsten, chromium, iron, vanadium, manganese cobalt, or combinations thereof. The boron nitride may include up to 10% of any combination of oxygen, calcium or carbon. These elements are usually present in commercially available boron nitride sputtering targets as components of the binder. It has been found that the inclusion of oxygen is of particular advantage in the analysis of oxygen. In addition to the foregoing, stoichiometric variations of the boron and nitrogen of plus or minus 25% are possible within the scope of the present invention; that is to say, the BN layer may comprise, on an atomic basis 25–75% boron and 75–25% nitrogen together with up to 10% aggregate of carbon, oxygen or calcium.

In the illustrated embodiment of FIG. 2, there are depicted three layer pairs 23a–23c; however, it is to be understood that in a typical device a larger number of pairs is generally employed. A typical device includes at least 50 pairs and may include over 100 layer pairs. Generally, devices with a smaller d spacing will have a larger number of layer pairs than devices with a larger d spacing. In FIG. 2, the layers A, B of each pair 23 are depicted as being of approximately equal thickness. It is also to be understood that this is not required in accord with the present invention. The thickness of each separate layer of the pair may differ. As noted above, Bragg's law includes a factor d which is defined as the repeat spacing of the reflecting structure. In the reflective element 22 of FIG. 2 d is equal to the combined thickness of each member A, B of a layer pair 23. In the devices of the present invention, the d-spacing is preferably in the range of 10–200 angstroms; although it is to be understood that, in accord with Bragg's law, greater or lesser d spacings may be required for some particular applications.

In the device illustrated in FIG. 2, the members A and B of each layer pair 23 have sharp interfaces therebetween, that is to say there is an abrupt change in material composition at each interface. Thus, the composition varies, vertically, in a square wave fashion as is shown schematically at 26 in FIG. 2. It will be appreciated that the random interface thickness variation of the various layers of the device 22 should be minimized if performance of the device 22 is to be optimized. Incorporation of roughness into the structure reduces achievable reflectivity. A paramaterization of surface roughness well known in the art is described in detail, for example in "Determination of Thickness Errors and Boundary Roughness from the Measured Performance of a Multilayer Coating", Spiller et al, *Optical Engineering*, August 1986, vol. 25, No. 8, pp 954–963. A different paramaterization has been used in U.S. Pat. No. 4,727,000. Practically, the paramaterization scheme is of lesser significance. The degree of perfection of the structure is measured by comparing its performance to the performance which would be achieved by a perfect structure. Using the paramaterization described in Spiller, supra, it has been found that surface roughness in the range of 4–6 Å is within the capability of the state of the deposition art and provides a device having excellent performance characteristics. Finally, it is to be understood that while not illustrated in FIG. 2, the layer pairs 23 of the reflective structure 22 are supported upon a substrate. There are a variety of substrate materials which may be employed. The substrate should be geometrically stable and compatible with the materials deposited thereupon. One particularly preferred substrate material comprises a single crystal silicon, although substrates of glass, metals or various other crystalline materials may be employed.

FIG. 2 illustrates the reflection and consequent dispersion of an incident beam 18 of x-ray radiation from the device 22. For purposes of clarity, only the reflection from the first layer pair 23a is shown, although it is to be understood that similar reflection will occur from each of the succeeding layer pairs, and the beams reflected from each will constructively and destructively interfere as is well known in the art. The angle of incidence and the angle of reflection are both equal and are designated here as $\theta$. As noted above, Bragg's law includes the factor n defining the reflected wavelength, and this indicates that the reflected beam 18' will include not only the primary wavelength $\lambda$ but also various harmonics of $\lambda$; i.e., $\lambda/2, \lambda/3 \ldots \lambda/n$. Therefore, the reflected beam 18' contains various of these wavelengths. In some cases, these harmonics present no problem to the analysis; in other instances they may be removed by appropriately filtering either the incident 18 or reflected 18' beam.

Referring now to FIG. 3, there is shown another embodiment of reflective element 30 structured in accord with the principles of the present invention. This embodiment includes a number of layer pairs 33a–33c; however, each layer pair 33 is of a graded composition such that the composition, and electron density thereof vary throughout, for example in a sinusoidal fashion. In a composition of this type the d-spacing is considered to be the periodicity of the compositional variation; i.e., the variation from a high concentration of the first material to a high concentration of the second material, and a single period defines a layer pair. Such structures are disclosed in detail in U.S. Pat. No. 4,727,000. The main advantage of structure 30 of FIG. 3 is that the sinusoidal variation of the maximum electron density causes the reflected beam 18" to have the minimum radiation intensity, in the higher order reflections. It is to be understood that with regard to the FIG. 3 embodiment, the definition of each layer within a pair, and the precise delineation of each pair is somewhat arbitrary; nevertheless, within the context of the present disclosure a layer pair is defined to include a compositional variation from maximum to minimum electron density, and the thickness thereof is equivalent to the d-spacing.

One preferred technique for the fabrication of the devices of the present invention is planar magnetron sputtering. Generally in sputtering, a plasma is created from a working gas by input of electromagnetic energy in either the form of a dc or ac signal. Most typically in ac applications radio frequency excitation of the working gas is employed. The material to be sputtered is formed into a target which is made the cathode of the sputtering system. The cathode is impinged by energetic plasma ions which cause the ejection of material from the target, and this material condenses on a substrate maintained proximate to the target. As is well known in the art, many modifications may be made to the basic process. The substrate and target may be either heated or cooled. An electrical bias or ion bombardment may be employed to facilitate the deposition. In magnetron sputtering, a magnetic field is employed to confine the plasma to the vicinity of the target. This results in enhanced deposition rates and prevents damage to the depositing film from plasma ions and electrons. Magnetron sputtering has been found particularly advantageous for depositing the boron nitride layers of the present invention since it permits completely adequate control of the BN stoichiometry. For this reason, films may be made in accord with the present invention without the need for any background atmosphere of nitrogen. Thus the process of the present invention is simple to implement and provides high quality films which result in efficient reflective devices.

Figure 4:
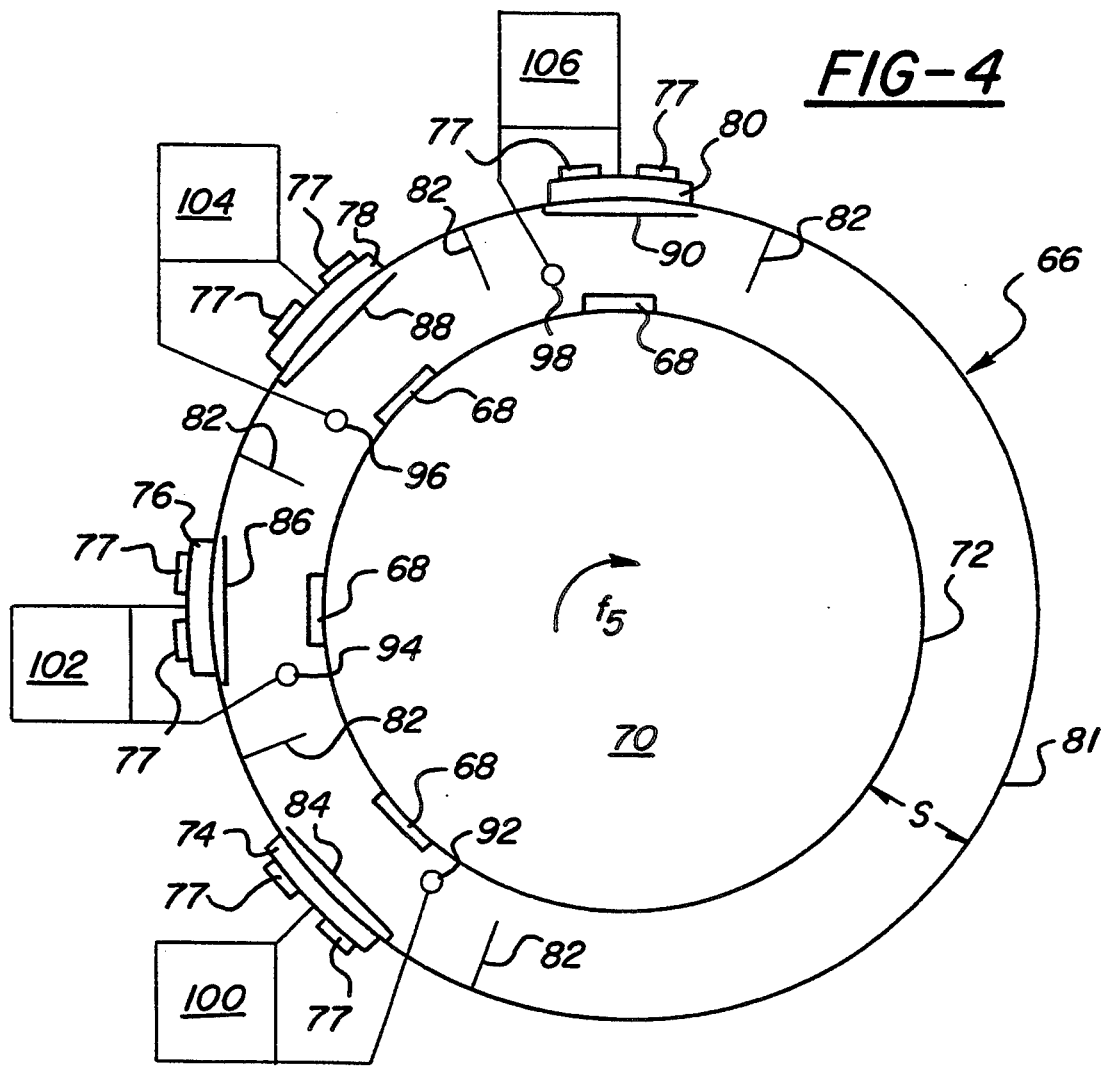
FIG. 4 is a diagrammatic representation of a planar magnetron deposition apparatus which may be used in the practice of the present invention.

Referring now to FIG. 4, there is shown one embodiment of a planar magnetron sputtering system 55 which may be employed in the practice of the present invention. The system 55 of FIG. 4 is a high volume system which can simultaneously prepare a number of multilayered devices. The system 55 includes a plurality of deposition stations, each of which deposits a single layer of material. The system 66 includes a plurality of targets 74, 76, 78 and 80 affixed to the shell 81 of the apparatus. As is well known in the art, each target has a number of magnets 77, associated therewith for generating the plasma-confining field. The targets 74, 76, 78 and 80 are separated from a plurality of substrates 68 which are affixed to a rotating drum 70. The drum 70 is rotated at a frequency of "$f_5$" so as to pass the substrates 68 past the targets in sequence. It is to be understood that the drum 70 may be heated or cooled as needed to control substrate temperature, and an electrical bias or ion bombardment may be employed to further control the deposition thereupon.

Each target 74, 76, 78 and 80 is isolated by a variable height isolation shield and includes a shutter 84, 86, 88 and 90 associated therewith. A deposition rate monitor 92, 94, 96 and 98 is associated with each target and is coupled to a respective power supply 100, 102, 104 and 106. Each target thus has its own power supply, shutter and deposition monitor controlled at each deposition station. Although four stations have been illustrated, more or less can be provided.

The space s between the drum surface 72 and shell 80 is varied to control the impact of the secondary electrons on the substrate so as to maximize the decoupling of the magnetron confined plasma from the substrate so as to provide a more uniform and controlled deposition. The system 66 is operated under reduced pressure with a sputtering atmosphere such as argon. It will be appreciated by providing the appropriate target materials and by rotating the substrate 68 past the various deposition stations, a number of layer pairs may be efficiently deposited thereupon to provide the structures of the present invention.

An ion beam deposition system may also be employed to prepare the reflective structures of the present invention. An ion beam deposition is particularly advantageous for the preparation of the graded structures of FIG. 3.

Figure 5:
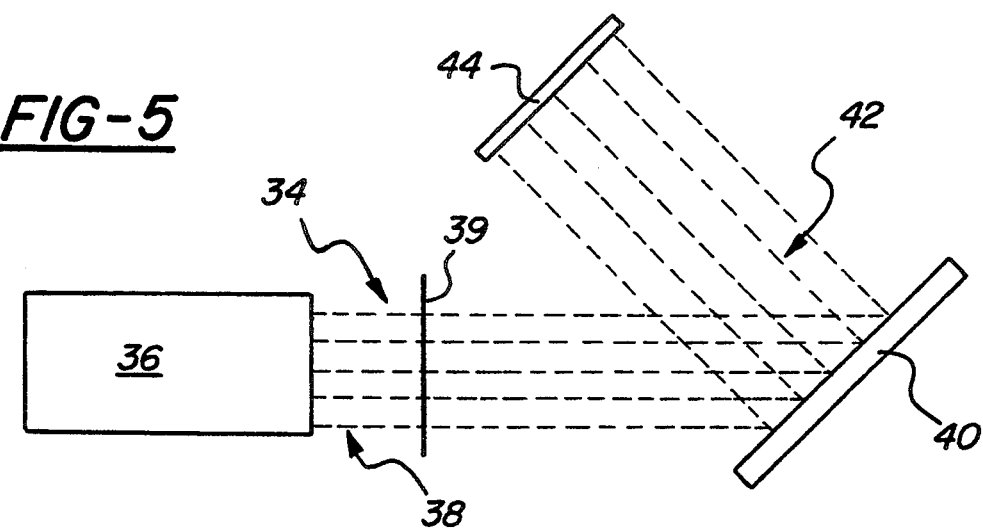
FIG. 5 is a schematic depiction of an ion beam deposition system which may be used in the practice of the present invention.

FIG. 5 depicts an ion beam deposition system 34 which may be employed in the practice of the present invention. The system 34 includes an ion source 36 which generates a beam of ions 38. The ions are at least partially neutralized, as for example by a charged grid 39 or the like, and are directed at a target 40. The beam 38 sputters material from the target 40 into a substantially collimated and uniform stream 42 which deposits a layer on a suitable substrate 44. The substrate can be mounted on a holder, not shown, and the system 34 is maintained under vacuum during its operation. As is known in the art, the substrate 44 can be heated or cooled as desired to affect the structure of the material being deposited.

In a typical ion beam deposition system, an inert gas such as argon is the working medium and the density of the ion beam 38 is in the neighborhood of 10 milliamps per centimeter squared. As noted, the beam is generally neutralized prior to impact on the target 40, although neutralization need not be complete, and in some instances, an ionized beam is preferred. Typical operating pressures for systems of this type are in the neighborhood of $10^{-4}$ torr. In order to form the structures of the present invention, the material of the target 40 must be changed. This may be accomplished by employing two separate targets which are alternately switched, or by employing a single target having two different portions, and by alternately shielding and exposing the different portions. In order to manufacture a graded structure such as that of FIG. 3, a single target 40 having portions of differing compositions may be rotated or otherwise moved through the ion beam 38 so that the composition of the ejected stream 42 varies correspondingly. Such techniques are disclosed in U.S. Pat. No. 4,727,000.

One particularly preferred reflective structure of the present invention comprises an assemblage of boron nitride and nickel layer pairs. This combination of materials is particularly advantageous for use in systems for analyzing nitrogen, oxygen and fluorine since these structures efficiently reflect x radiation in the energy range of 0.25 KeV–0.85 KeV.

One particularly preferred device comprises 60 layer pairs of nickel and boron nitride, each layer pair having a thickness of 55 angstroms. The reflectivity at Cvk$\alpha$ is 94% of the maximum achievable from a perfect structure. All layers are deposited by planar magnetron sputtering without the use of any background pressure of reactive gas such as nitrogen. A similar device which employs tungsten and boron nitride as components of the layer pairs is also good for nitrogen detection.

EXAMPLES

I. Method of Making the Reflective Elements

A nickel-boron nitride device was prepared in accord with the present invention by magnetron sputtering, in an apparatus generally similar to that of FIG. 4. The apparatus included a nickel target and a boron nitride target. The deposition system was evacuated to a base pressure $2 \times 10^{-6}$ torr and then back-filled with an operating atmosphere of 1 micron of argon and the target-substrate distance was 45 mm. The nickel target was 3.5"×8.0" and was energized with 13.56 MHz energy at 100 watts. The boron nitride target was also 3.5"×8.0" in size and was energized with 13.56 MHz at a power level of 600 watts. The rotational speed was 139 sec/rotation and the completed device comprised 50 layer pairs having a d spacing of 55 Å. The nickel content of the resultant device was 37% and the optical element reflected 90% of x-rays having an energy equal to the Cuk$\alpha$ emission.

II. Performance Test of the Reflective Elements

In order to demonstrate the advantages of the present invention, a series of x-ray reflective structures were prepared, and these devices were evaluated with regard to their suitability for use in the measurement of the x-ray fluorescence of nitrogen. In a model 35-C FCS analyzer manufactured by the JEOL Corp., a broad band of x radiation was impinged upon the structures and a detector was disposed to measure the x-rays over the wavelength range 29–34 Å characteristic of nitrogen fluorescence. The reflective structures were fabricated upon curved substrates and the x-ray source was essentially a point-type source. The output of the detector, at a wavelength of 31.6 Å in counts per second, was taken as a relative measure of the intensity of the diffracted x-rays, and hence the efficiency of the device.

The first device comprised a series of 60 tungsten and silicon layer pairs having a d-spacing of 25 angstroms. This device represents a currently employed commercial product and the signal intensity was 2898 counts per second. A second device comprised 60 layer pairs of tungsten and boron nitride having a d-spacing of 55 angstroms. The output under similar conditions was 31,398 counts per second. The third device comprised 60 layer pairs of nickel and boron nitride, prepared as described above, and had a d-spacing of 55 angstroms. This device provided a detector reading of 50,611 counts per second. The final device includes 60 layer pairs of iron and scandium having a d-spacing of 56.5 angstroms. This device provided a detector output of 88,009 counts per second.

It will be seen from the foregoing that the iron-scandium device did provide the highest output signal; however, this material operates in an extremely narrow energy window and is only suitable for the nitrogen signal and is difficult to fabricate and environmentally unstable. The nickel-boron nitride system gave a very high reading and is also useful for measuring oxygen and fluorine. The tungsten-boron nitride system is somewhat less efficient than the nickel-boron nitride, but still over 10 times better than the standard tungsten silicon system.

III. Method of Using the Reflective Elements

A second experimental series generally similar to the first in this case, to demonstrate the method of using the device was carried out on a commercial fluorescence analyzer sold by the Phillips Corp. under the designation "4-Position Vacuum Spectrometer." This apparatus used a narrow collimator to provide a relatively large beam of x-rays. The reflective structures of this experimental series were identical to those of the first series since they were prepared concomitantly with the first set; however those of the second series were prepared on flat substrates.

Figure 6:
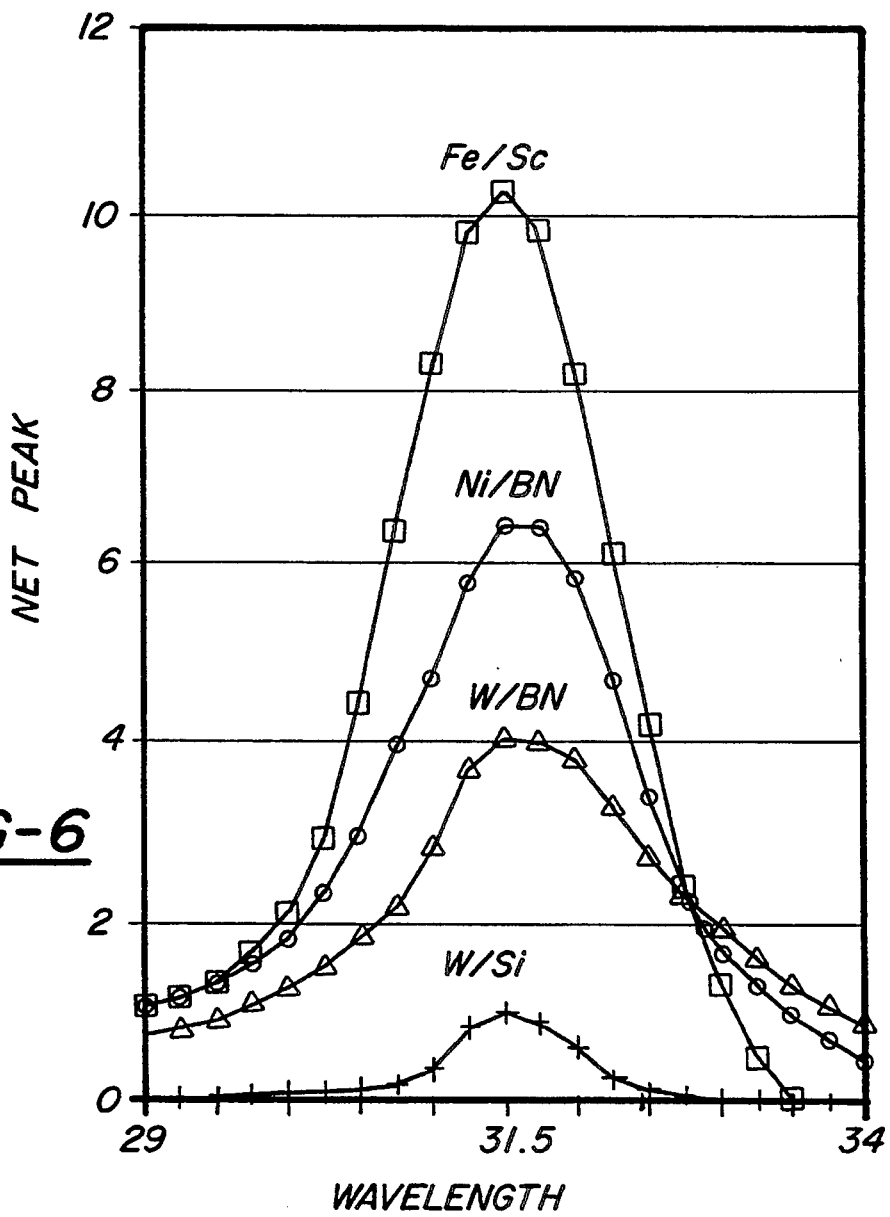
FIG. 6 is a graph showing the x-ray reflectivity of a number of multilayer structures, illustrating the advantages of the present invention.

Data from this second experimental series is summarized in FIG. 6. Reflectivity is plotted as a function of wavelength and has been normalized, with the reflectivity of W-Si, which is the presently employed commercial product made equal to 1. It will be noted that the performance of these devices is generally similar to those of the first experimental series.

Thus it will be appreciated that the present invention provides a planar magnetron deposition method for preparing boron nitride containing x-ray reflective elements. Use of the planar magnetron sputtering system eliminates concerns over changes of stoichiometry and provides for the simple and accurate manufacture of high quality reflective elements. The present invention further provides a specific nickel boron nitride reflective element which is extremely efficient, stable and easy to fabricate.

It is to be understood that the foregoing discussion and description are merely meant to be illustrative of particular embodiments of the present invention and are not meant to be limitations upon the practice thereof. It is the following claims, including all equivalents, which define the scope of the invention.

We claim:

1. An x-ray reflective structure comprising a plurality of superposed layer pairs, a first member of each pair comprising a layer of boron nitride and a second member of each pair comprising a layer of a material selected from the group consisting of: nickel, chromium, vanadium, iron, manganese, cobalt and combinations thereof;
   said x-ray reflective structure having a d-spacing which is in the range of 10–200 angstroms.

2. An x-ray reflective structure as in claim 1 comprising at least 50 of said superposed layer pairs.

3. An x-ray reflective structure as in claim 1, wherein the d-spacing of said layer pairs is 55 angstroms.

4. An x-ray reflective structure as in claim 1, wherein the d-spacing of said layer pairs is 40 angstroms.

5. An x-ray reflective structure as in claim 1, wherein said second member of each pair comprises Nickel.

6. An x-ray reflective structure as in claim 1, wherein each layer pair includes a distinct compositional interface between said layer of boron nitride and said second member.

7. An x-ray reflective structure as in claim 6, wherein the surface roughness of each layer of boron nitride and each layer of said second member is approximately 5 angstroms rms.

8. An x-ray reflective structure as in claim 1, wherein each layer pair includes a graded compositional interface between said layer of boron nitride and said layer of nickel.

9. An x-ray reflective structure as in claim 8, wherein said graded compositional interface is sinusoidally graded.

10. An x-ray reflective structure as in claim 1, wherein said boron nitride layer comprises, on an atomic basis, 25–75% boron and 75–25% nitrogen.

11. An x-ray reflective structure as in claim 1, wherein said boron nitride layer includes, on an atomic basis, up to 10% of a material selected from the group consisting of: carbon, oxygen, calcium, and combinations thereof.

* * * * *